(12) United States Patent
Yazawa

(10) Patent No.: US 9,288,394 B2
(45) Date of Patent: Mar. 15, 2016

(54) STAGE APPARATUS AND CAMERA SHAKE CORRECTION APPARATUS

(71) Applicant: PENTAX RICOH IMAGING COMPANY, LTD., Tokyo (JP)

(72) Inventor: Kazuki Yazawa, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 135 days.

(21) Appl. No.: 13/744,873

(22) Filed: Jan. 18, 2013

(65) Prior Publication Data

US 2013/0194442 A1 Aug. 1, 2013

(30) Foreign Application Priority Data

Feb. 1, 2012 (JP) ................................. 2012-020130
Feb. 1, 2012 (JP) ................................. 2012-020131

(51) Int. Cl.
*H04N 5/232* (2006.01)

(52) U.S. Cl.
CPC ......... *H04N 5/23264* (2013.01); *H04N 5/2328* (2013.01); *H04N 5/23258* (2013.01)

(58) Field of Classification Search
CPC .......... H04N 5/23287; H04N 5/23251; H04N 5/2328; H04N 5/23248; H04N 5/23264; H04N 5/23261; H04N 5/2253; G03B 2217/002; G03B 2205/0038; G03B 2205/0061; G03B 5/00; G03B 19/12; H05K 1/0393
USPC ...................... 348/208.99–208.11; 396/52–55
See application file for complete search history.

(56) References Cited

U.S. PATENT DOCUMENTS

| | | | |
|---|---|---|---|
| 6,154,611 A * | 11/2000 | Washisu | G02B 27/646 348/E5.046 |
| 7,639,933 B2 | 12/2009 | Seo et al. | |
| 7,826,732 B2 | 11/2010 | Enomoto | |
| 2006/0055787 A1* | 3/2006 | Hirota | G03B 5/00 348/208.5 |
| 2006/0070302 A1* | 4/2006 | Seo | H04N 5/2253 52/6 |

(Continued)

FOREIGN PATENT DOCUMENTS

| | | |
|---|---|---|
| JP | 2001-275022 | 10/2001 |
| JP | 2007-025180 | 2/2007 |

(Continued)

OTHER PUBLICATIONS

Office Action issued in Japan Counterpart Patent Appl. No. 2012-020131, dated Dec. 1, 2015.

*Primary Examiner* — Pritham Prabhakher
(74) *Attorney, Agent, or Firm* — Greenblum & Bernstein P.L.C.

(57) ABSTRACT

A stage apparatus includes a stationary support plate, magnetic force generators immovable relative to the stationary support plate, a stage member, an image sensor fixed to the stage member, a control circuit board connected to a side of the stage member, and coils which produce a driving force upon a supply of electric current thereto, the coils being fixed to the stage member at an opposite side of the center of the stage member with respect to the control circuit board, and a FPC board between the stationary support plate and the stage member. The stationary support plate is recessed, from a lateral edge of the stationary support plate at which the control circuit board is provided, in a direction toward the coils and includes an FPC board escape recess, in which said FPC board is partially positioned.

12 Claims, 6 Drawing Sheets

(56) References Cited

U.S. PATENT DOCUMENTS

| | | | |
|---|---|---|---|
| 2007/0014555 A1 | 1/2007 | Hirunuma et al. | |
| 2008/0085108 A1 | 4/2008 | Sekino et al. | |
| 2008/0225126 A1* | 9/2008 | Mogamiya | H04N 5/23248 348/208.4 |
| 2009/0201399 A1* | 8/2009 | Senga | H04N 5/2253 348/294 |

FOREIGN PATENT DOCUMENTS

| | | |
|---|---|---|
| JP | 2007-025616 | 2/2007 |
| JP | 2007-41419 | 2/2007 |
| JP | 2009-058805 | 3/2009 |
| JP | 4385756 | 10/2009 |
| JP | 2011-081417 | 4/2011 |

* cited by examiner

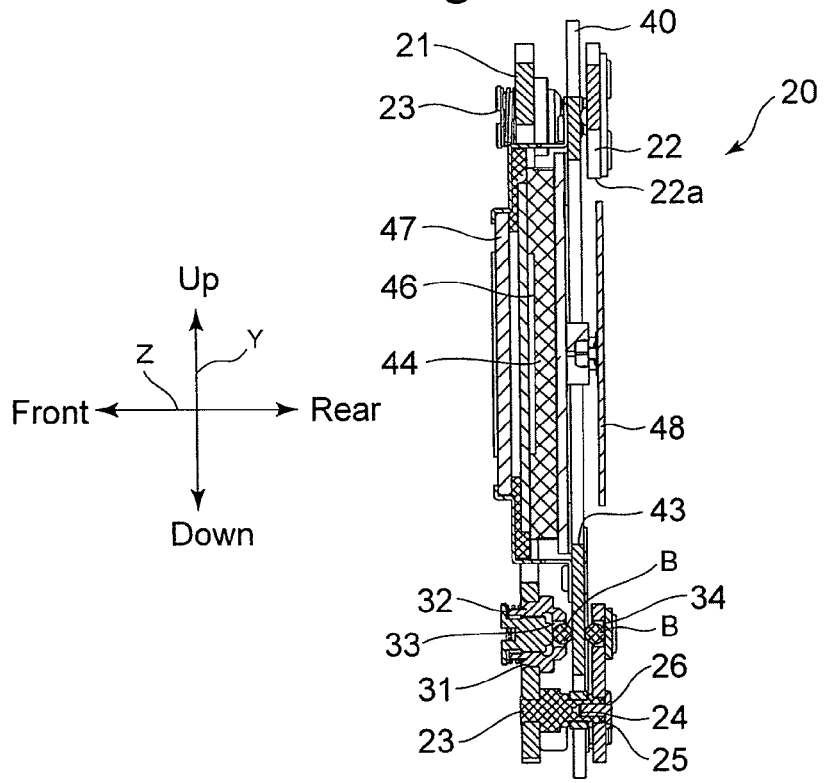
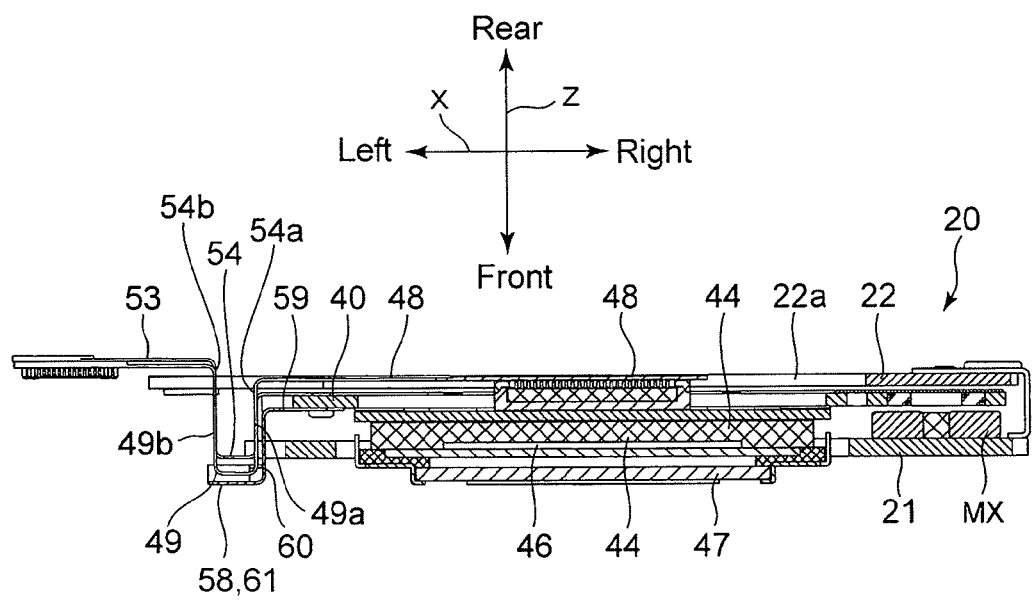

STAGE APPARATUS AND CAMERA SHAKE CORRECTION APPARATUS

BACKGROUND OF THE INVENTION

1. Field of the Invention

The present invention relates to a stage apparatus including a movable stage supported to be movable in a specific plane, and a camera shake (image shake) correction apparatus incorporating the stage apparatus.

2. Description of the Related Art

As a first example of a camera shake correction apparatus (image shake correction apparatus/image stabilizer) of the related art, a camera, in which object images are captured by an image sensor (image pickup device/electronic device), is provided with a rear yoke (stationary support plate), a front yoke, a stage plate and a plurality of magnets. The rear yoke is fixed to an inner surface of the camera body, and the front yoke is positioned immediately in front of the rear yoke. The stage plate is positioned between the front yoke and the rear yoke, and is movable in a plane in a direction parallel to the both the front and rear yokes. The magnets are fixed to the rear surface of the front yoke. The image sensor and a plurality of coils are fixed to the front surface of the stage plate. The magnets, the front yoke and the rear yoke form magnetic fields, and the respective coils stay within these magnetic fields regardless of the positions thereof. One end of a flexible printed circuit (FPC) board is fixed to the rear surface of the stage plate. The one end of the FPC board is electrically connected to a coil, and the other end of the FPC board is electrically connected to a control circuit board (controller).

According to the first example of the related art, when the camera is shaken (for example, when an operator's hand unintentionally shakes), the controller passes an electric current through the coils. Each coil produces a driving force, whereby the stage plate and the image sensor slidably move. Thus the image shake of camera is corrected.

A second example of the related art is disclosed in Japanese unexamined patent publication No. 2011-81417.

According to this second example of the related art, a camera shake correction apparatus is provided with a stationary support plate fixed to an inner surface of a camera body, a stage plate, a plurality of yokes fixed to and projecting rearward from the rear surface of the stationary support plate, and a plurality of magnets fixed to the front of the respective yokes. The stage plate comprises a circuit board (a rigid material) and is slidably movable parallel to the stationary support plate.

The stage plate is provided, on the front surface thereof, with an image sensor that is rectangular in shape as viewed from the front, an X-direction drive coil on the right side (short side) of the rectangular-shaped image sensor, and a pair of Y-direction drive coils on the lower side (long side) thereof. The Y-direction drive coils are aligned in a l direction parallel to the long side of the rectangular-shaped image sensor and have the specifications (the same number of coil windings) as each other. Regardless of the position of the stage plate, the X-direction drive coil and the pair of Y-direction drive coils stay within the magnetic field formed by the rear part of yokes and the magnets.

According to the second example of the related art, when a controller inside the camera body passes an electric current through the X-direction drive coil, the X-direction drive coil produces a driving force in the X-axis direction (the direction parallel to the long side of the image sensor), whereby the stage plate moves linearly in the X-axis direction. When the controller passes the same amount of electric current through each of the pair of Y-direction drive coils, each of the Y-direction drive coils produces the same amount of driving force in the Y-axis direction (direction parallel to the short side of the image sensor), respectively, whereby the stage plate moves linearly in the Y-axis direction. On the other hand, when the controller passes two different values of electric current through the respective Y-direction drive coils, each of the pair of Y-direction drive coils produces a different value of driving force, whereby the stage plate rotates in an X-Y axis plane.

Upon detecting a camera shake, the controller supplies electric current to each drive coil for compensating (correcting) the image shake. For example, if the camera shakes in the X-axis direction, electric current is supplied to the X-direction drive coil, whereby the stage plate slides in the X-axis direction opposite to the direction of camera shake. Similarly, if the camera shakes in the Y-axis direction, the same amount of electric current is supplied to the pair of Y-direction drive coils, whereby the stage plate slides in the Y-axis direction opposite to the direction of camera shake. If the camera shakes in a rotational direction, the controller supplies electric current to the X-direction drive coil and to the pair of Y-direction drive coils, while each of the pair of Y-axis direction drive coils is supplied with a different value of electric current, accordingly, the stage plate rotates in the direction opposite to the rotational direction of camera shake.

These stage apparatuses and camera shake correction apparatuses are disclosed in Japanese Unexamined Patent Publication No. 2011-81417 and Japanese patent No. 4,385,756.

According to the first example of the related art, in general, the camera shake correction apparatus is provided with the control circuit board immediately at the rear of the rear yokes, and each of the coils (the stage plate) is electrically connected to the control circuit board via the FPC board.

However, in recent years, since cameras have become increasingly slimmer (i.e., camera body sizes have been increasingly reduced in the optical axis direction), there has also been an increasingly demand for a slimmer camera shake correction apparatus. However, since the control circuit board is positioned at the rear of the rear yokes, the thickness of the camera shake correction apparatus cannot be slimmed down.

According to the second example of the related art (Japanese unexamined patent publication No. 2011-81417), since there is only one X-direction drive coil, it is difficult to drive (move) the stage plate in the X-axis direction with a large driving force. This problem can be solved by providing a pair of X-direction drive coils in a direction parallel to the short side of image sensor on the stage plate so that the controller supplies the electric current at the same value to the pair of X-direction drive coils.

However, this solution (structure) still has the following problems.

If the pair of X-direction drive coils is positioned at the upper side and the lower side, respectively, of a reference straight line extending in the X-axis direction and passing through the center of gravity of an integrated movable body of the stage plate, the image sensor, the pair of X-direction drive coils and the pair of Y-direction drive coils, and if the distance in the Y-axis direction from the reference straight line to the each of X-direction drive coils is the same, the stage plate would move linearly in the X-axis direction upon supplying the same value of electric current to the pair of X-direction drive coils.

However, due to increasing demand for miniaturized and light-weight camera body, the size of stage plate has become smaller (miniaturized), thereby causing unwanted restrictions on the positioning of the image sensor, the pair of X-direction drive coils and the pair of Y-direction drive coils fixed to the stage plate, and hence the distance in the Y-axis direction from the reference straight line to the each of X-direction drive coils sometime need to be made to differ from each other. If the same amount of electric current is supplied to the each of X-direction drive coils having a different distance from the reference straight line, the stage plate does not move linearly but only rotates, and the camera shake correction either in the X-axis direction or the rotative direction cannot be carried out precisely.

Even in the case of each of the X-direction drive coils being positioned at different distances in the Y-axis direction from the reference straight line, the stage plate can move linearly in the X-axis direction if a different amount of electric current is supplied to the each of X-direction drive coils; however, the control of electric current supply to the pair of X-direction drive coils would become complicated. Additionally such a structure requires at least two independent drivers for driving the pair of X-direction drive coils, which would increase the number of component parts.

Linear movement of the stage plate in the X-axis direction can also be achieved by providing different types of X-direction drive coils (i.e., two coils having different coil windings). When the same amount of electric current is supplied to the pair of X-direction drive coils having different coil windings, each coil produces a different driving force in accordance with the respective number of coil windings, whereby the stage plate moves linearly in the X-axis direction. However, this structure requires at least two types of X-direction drive coils having different coil windings, which would result in the higher production cost.

SUMMARY OF THE INVENTION

The present invention provides a stage apparatus and a camera shake correction apparatus which can be respectively slimmed down (so as to have a low-profile).

The present invention also provides a stage apparatus and a camera shake correction apparatus in which, although each of a pair of coils for producing a driving force in one direction has the same structure and is supplied with the same amount of electric current to the respective coil circuits, the stage plate can move linearly in the one direction.

According to an aspect of the present invention, a stage apparatus is provided, including a stationary support plate; a magnetic force generator which is immovable relative to the stationary support plate; a stage member which superposes the stationary support plate in a thickness direction of the stationary support plate, wherein the stage member is slidably movable relative to the stationary support plate in a plane; an image sensor fixed to the stage member; a control circuit board which is immovably provided at a lateral side of the stage member; and a coil, which produces a driving force upon a supply of electric current thereto, positioned within a magnetic field produced by the magnetic force generator, the coil being fixed to the stage member at a position on an opposite side of the center of the stage member with respect to the control circuit board; and at least one FPC board provided between the stationary support plate and the stage member, the FPC board electrically connecting the image sensor and the control circuit board, and transmitting an electric signal between the image sensor and the control circuit board. The stationary support plate includes an FPC board escape recess which is recessed, from a lateral edge of the stationary support plate at which the control circuit board is provided, in a direction toward the coil, the ETC board being partially positioned in the ETC board escape recess.

Accordingly, each of the FPC (flexible printed circuit) boards for electrically connecting the control circuit board and the image sensor is partially positioned inside the FPC board escape recess of the stationary support plate. Therefore, even if the stage member is made slimmer (so as to have a low profile), the FPC boards do not easily touch the stationary support plate, and hence, the FPC boards are protected from abrasion and damage.

In an embodiment, a stage apparatus is provided, including a stationary support plate; a magnetic force generator which is immovable relative to the stationary support plate; a stage member which superposes the stationary support plate in a thickness direction of the stationary support plate, wherein the stage member is slidably movable relative to the stationary support plate in a plane; a control circuit board which is immovably provided at a lateral side of the stage member; an image sensor fixed to the stage member; and a first FPC board provided between the stationary support plate and the stage member, the first FPC board electrically connecting the image sensor and the control circuit board. The stage member is provided with a cover member fixed thereto, for protecting at least a part of the first FPC board.

Accordingly, there is the cover member for protecting the part of the first FPC board, thus the protected part will not become in touch with any part in the vicinity of the stage apparatus (excluding the stage apparatus itself). Therefore, even if the thickness of stage apparatus is made smaller, the first FPC board is protected from abrasion and damage.

It is desirable for the stage apparatus to further include a coil, which produces a driving force upon a supply of electric current thereto, positioned within a magnetic field produced by the magnetic force generator, the coil being fixed to the stage member at a position on an opposite side of the center of the stage member with respect to the control circuit board; and a second FPC board provided between the stationary support plate and the stage member, the second FPC board electrically connecting the coil and the control circuit board, and supplying electric current from the control circuit board to the coils.

It is desirable for at least one of the first FPC board and the second FPC board to include at least one deformed portion having a flexibly changeable shape, formed in a part facing, in the thickness direction, a clearance between the stage member and the control circuit board, and projects in a direction opposite to the stationary support plate. The cover member faces the deformed portion from a side opposite to the stationary support plate.

In an embodiment, a camera shake correction apparatus is provided in camera, the camera shake correction apparatus using the above-described stage apparatus, wherein the stage apparatus is incorporated in the camera, the camera shake correction apparatus is further provided with a gyro sensor for detecting image shake of the camera, and the control circuit board passes electric current through the coils based on angular velocity information detected by the gyro sensor to compensate image shake of an object image captured by the image sensor.

In an embodiment, a stage apparatus is provided, including an integrated movable body which is slidably movable; a pair of coils, each of which applies a linear driving force in one driving direction to the integrated movable body upon an electric current being passed through the pair of coils, the pair of coils being positioned in a magnetic field; and a single driver for carrying out an electric current control on the pair of coils. The distance orthogonal to the one driving direction from the center of gravity of an integrated movable body to the center of driving force of one of the pair of coils is longer than the direct distance from the center of gravity to the center of driving force of the other of the pair of coils. The stage apparatus is further provided with a driving force reducer for reducing the driving force in an electric circuit electrically connected to the one of the pair of coils that has a longer direct distance from the center of gravity to the center of driving force thereof.

In an embodiment, a camera shake correction apparatus is provided in camera, the camera shake correction apparatus including the above-described stage apparatus, wherein the stage apparatus is incorporated in the camera, the stage apparatus is further provided with one of an image shake correction lens and an image sensor fixed thereto, the camera shake correction apparatus is further provided with a gyro sensor for detecting image shake of the camera, and the electric power supply passes electric current through the pair of coils based on angular velocity information detected by the gyro sensor to compensate image shake of an object image formed through the image shake correction lens or formed on the image sensor.

It is desirable for the camera shake correction apparatus to include at least one FPC board, wherein one end of the at least one FPC board is electrically connected to the pair of coils, and/or the image sensor, for supplying electric current to the coils. A control circuit board serving as the electric power supply which is provided at a lateral side of the stationary support plate and at an opposite side of the image shake correction lens or image sensor with respect to the pair of coils, and wherein the other end of the FPC board is electrically connected to the control circuit board.

According to the present invention, the control circuit board is provided at one side of the stage member in a lateral direction thereof. Accordingly, the stage apparatus and the camera shake correction apparatus can be have a low-profile shape compared with the related art in which the stage member, stationary support plate and controller are superposed onto one another.

Furthermore, according to the stage apparatus and the camera shake correction apparatus of the present invention, the integrated movable body is provided with the stage member, the first coil and the second coil. The distance from the center of gravity of the integrated movable body to the second coil is longer than that to the first coil. In other words, the linear distance in a direction orthogonal to the driving direction produced by driving force of the second coil is longer than that of the first coil. However, since the driving force reducer is provided for reducing the driving force produced by the second coil, although the first coil and the second coil have the same structure and the same value of electric current is supplied to the each of electric circuits where the first and second coils are positioned respectively, the stage plate can move linearly in one direction.

The present disclosure relates to subject matter contained in Japanese Patent Application Nos. 2012-020130 and 2012-020131 (both filed on Feb. 1, 2012) which are expressly incorporated herein by reference in their entireties.

BRIEF DESCRIPTION OF THE DRAWINGS

The present invention will be described below in detail with reference to the accompanying drawings in which:

FIG. 7 is a cross sectional view taken along the arrows VII-VII shown in FIG. 4;

FIG. 8 is a cross sectional view taken along the arrows VIII-VIII shown in FIG. 4;

DESCRIPTION OF THE PREFERRED EMBODIMENTS

A first embodiment of the present invention will be discussed in detail hereinafter with reference to FIGS. 1 through 9B. In the following description, the horizontal direction, the vertical direction and the forward/rearward direction of the digital camera 10 are referred to as an X-direction, a Y-direction and a Z-direction, respectively.

Firstly, the basic structures of the digital camera 10 and the camera shake correction apparatus 20 will be discussed hereinbelow.

Figure 1:
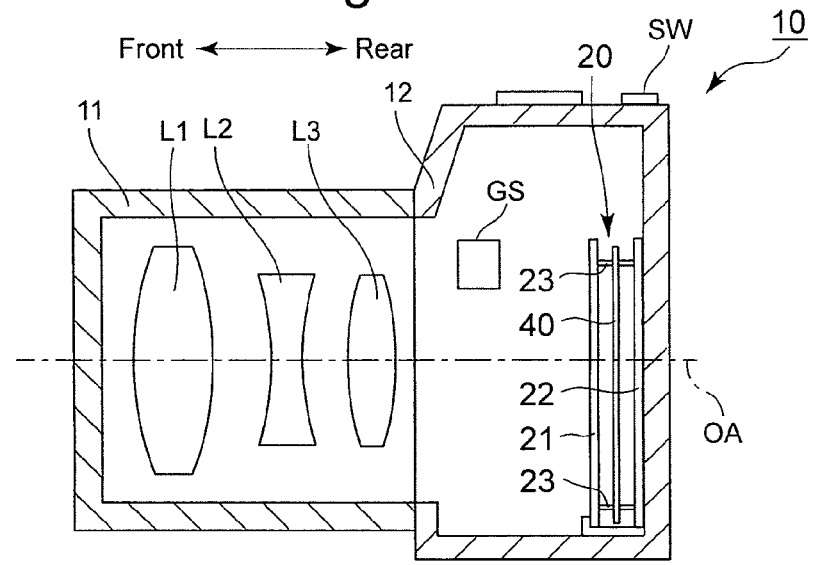
FIG. 1 is a longitudinal sectional view of a camera having a camera shake correction mechanism.

As shown in FIG. 1, a lens barrel 11 of the digital camera 10 is provided therein with a photographing optical system including a plurality of lens groups L1, L2 and L3, and the camera shake correction apparatus 20 is provided in a camera body 12, to which the lens barrel is detachably attached, behind the rearmost lens group L3.

As shown in FIGS. 2 through 9B, the camera shake correction apparatus 20 is provided with a front yoke 21 and a rear yoke (stationary support plate) 22, respectively, each having a flat-plate shape. The front yoke 21 is in the shape of a horizontally-elongated rectangle as viewed from the front and is made of a magnetic material such as a soft metal. The front yoke 21 is provided with a punched-out rectangular hole 28 at the center thereof. The rear yoke 22 is U-shaped as viewed from the front, and is made of a magnetic material such as a soft metal. In the illustrated embodiment, the two corners of the U-shaped rear yoke 22 are substantially square in shape (see FIG. 2), however, the present invention is not limited to this example; so long as the two corners formed by the three sides of the rear yoke 22 are both substantially right-angled, the two corners can have an alternative shape such as a rounded shape.

Figure 2:
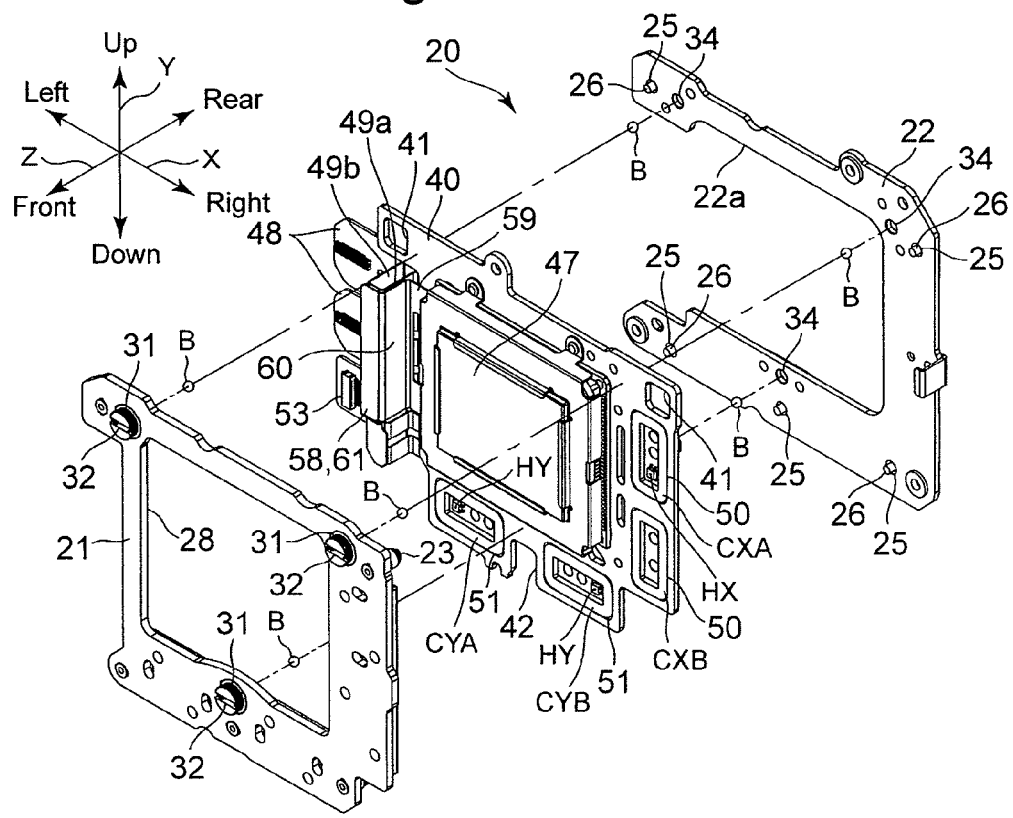
FIG. 2 is an exploded perspective view of the camera shake correction apparatus in which a control circuit board is not shown for the purpose of clarity, viewed obliquely from the front thereof.
Figure 3:
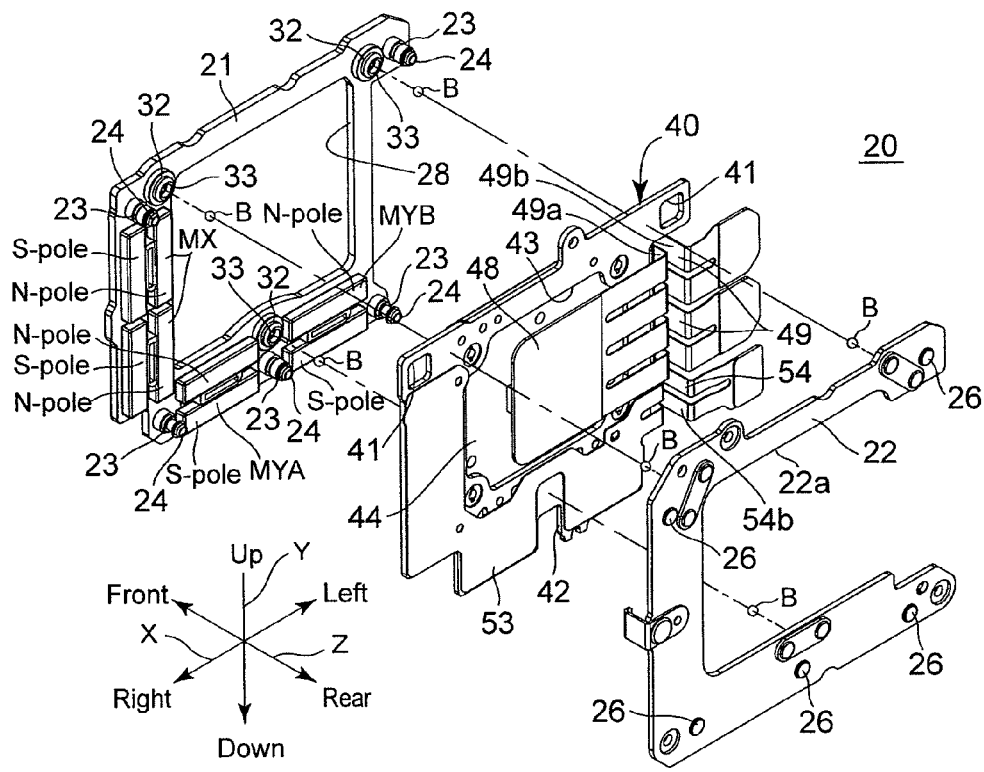
FIG. 3 is an exploded perspective view of the camera shake correction apparatus in which the control circuit board is not shown for the purpose of clarity, viewed obliquely from the rear thereof.

The front yoke 21 is provided, at five different positions on the rear surface thereof, with five connecting supports 23 which project rearwardly, and each of the five connecting supports 23 is provided at the rear end surface thereof with a female screw hole 24. An FPC board escape recess 22a is formed through the rear yoke 22 in the Z-direction (forward/rearward direction) and defines a recess that extends from the left edge towards the right side of the rear yoke 22. The FPC board escape recess 22a includes a "center through-hole" at the center and a consecutive "lateral side accommodation portion" on the left side. The rear yoke 22 is provided, at five different positions thereon which correspond to the positions of the five connecting supports 23, respectively, with five through-holes 25. As shown in FIGS. 2, 3 and 7, five set screws 26 are inserted into the five through-holes 25 from behind, and the five set screws 26 are screwed into the female screw holes 24 of the five connecting supports 23, respectively. Due to the screw engagement of the five set screws 26 with the five connecting supports 23, the front yoke 21 and the rear yoke 22 are fixedly connected so as to be parallel to each other. The rear yoke 22 is fixed to the internal surface of the camera body 12 by three set screws (not shown).

The front yoke 21 is provided with three fitting holes 31, each of which is circular in shape as viewed from the front thereof. As illustrated in FIG. 2, the two fitting holes 31 extend through the portions in the vicinity of the upper left corner and the upper right corner of the front yoke 21, respectively, while the other fitting hole 31 extends through the lower center portion of the front yoke 21. A retainer 32 is fixedly fitted into each fitting hole 31 from the rear side thereof. Each retainer 32 is provided, on the rear end surface thereof, with a circular-shaped ball support recess 33. The rear yoke 22 is further provided, on the front surface thereof, with three ball support recesses 34 that have substantially the same circular shape as that of the fitting holes 31. The two ball support recesses 34 are formed in the vicinity of the upper left corner and at the upper right corner of the rear yoke 22, while the other ball support recess 34 is formed at the lower center portion of the rear yoke 22.

The camera shake correction apparatus 20 is provided, on the rear surface of the front yoke 21 and on the right side of the rectangular hole 28 (i.e., the portion of the front yoke 21 that faces, in the forward/rearward direction, the portion of the rear yoke 22 on the opposite side of the open end of the FPC board escape recess 22a in the X-axis direction), with one pair of left and right X-direction magnets (magnetic force generator) MX positioned at the upper part of the front yoke 21, and another pair of left and right X-direction magnets (magnetic force generator) MX positioned at the lower part of the front yoke 21. Each of the two pairs of X-direction magnets MX has the same specifications, in which the rear half and the front half of the left magnet serve as an N-pole and an S-pole, respectively, and the rear half and the front half of the right magnet serve as an S-pole and an N-pole, respectively. When a stage plate (stage member) 40 is in an initial position shown in FIGS. 4 and 5, of which details will be discussed afterwards, the upper and lower pairs of X-direction magnets MX are aligned in the Y-axis direction and the positions of the upper and lower pairs of X-direction magnets MX in the X-axis direction are the same. The magnetic forces generated by the pairs of X-direction magnets MX and reaching the front yoke 21 and the rear yoke 22 (i.e., the passages of magnetic fluxes of the upper and lower pairs of X-direction magnets MX through the front yoke 21 and the rear yoke 22) form two X-direction magnetic circuits between the upper pair of X-direction magnets MX and the corresponding portion of the rear yoke 22 which face the upper pair of X-direction magnets MX in the Z-direction, and between the lower pair of X-direction magnets MX and the corresponding portion of the rear yoke 22 which face the lower pair of X-direction magnets MX in the Z-direction. These two X-direction magnetic circuits have the same magnetic flux density.

The camera shake correction apparatus 20 is further provided, on the rear surface of the front yoke 21 below the rectangular hole 28, with two (right and left) pairs of Y-direction magnets (magnetic force generator) MYA and MYB, which are arranged side by side in a straight line. When the stage plate (stage member) 40 is in an initial position shown in FIGS. 4 and 5, the left and right pairs of Y-direction magnets MYA, MYB are aligned in the X-axis direction, and the positions of the left and right pairs of Y-direction magnets MYA, MYB in the Y-axis direction are the same. Each of the two pairs of Y-direction magnets MYA and MYB has the same specifications, in which the rear half and the front half of the upper magnet serve as an N-pole and an S-pole, respectively, and the rear half and the front half of the lower magnet serve as an S-pole and an N-pole, respectively. The magnetic forces generated by the pairs of Y-direction magnets MYA, MYB and reaching the front yoke 21 and the rear yoke 22 (i.e., the passages of magnetic fluxes of the left and right pairs of Y-direction magnets MYA, MYB through the front yoke 21 and the rear yoke 22) form two Y-direction magnetic circuits between the Y-direction magnet MYA and the corresponding portion of the rear yoke 22 which face the Y-direction magnet MYA in the Z-direction, and between the Y-direction magnet MYB and the corresponding portion of the rear yoke 22 which face the Y-direction magnet MYB in the Z-direction. These two Y-direction magnetic circuits have the same magnetic flux density.

The camera shake correction apparatus 20 is provided between the front yoke 21 and the rear yoke 22 with the flat stage plate (stage member) 40 made of metal. The stage plate 40 is provided at the upper right corner and at the upper left corner thereof with two moving range limit holes 41, respectively. Additionally, the stage plate 40 is further provided, at the lower end thereof at the center in the X-axis direction, with an escape recess 42. Two of the five connecting supports 23 which project from the front yoke 21 in the vicinity of the right and left upper corners thereof pass through the two moving range limit holes 41 of the stage plate 40 in the Z-direction, respectively, while one of the five connecting supports 23 which projects from the lower end of the front yoke 21 at the center thereof in the X-axis direction passes through the escape recess 42 of the stage plate 40 in the Z-direction.

Three rotatable balls B are respectively accommodated in the corresponding three ball support recesses 33 of the retainers 32. These three balls B are positioned in front of the stage plate 40 in the Z-direction. Three other rotatable balls B are respectively accommodated in the corresponding three ball support recesses 34 that are formed on the front surface of the rear yoke 22. These other three balls B are positioned at the rear of the stage plate 40 in the Z-direction. The diameter of each of the balls B is substantially the same as, or slightly smaller than, the distance between the bottom surface of the ball support recess 33 of the retainer 32 and the front opposing surface of the stage plate 40 in the Z-axis direction, and also the distance between the bottom surface of the ball support recess 34 of the rear yoke 22 and the rear opposing surface of the stage plate 40 in the Z-axis direction. Thus each of the three balls B can come in rollable contact with the corresponding bottom surface of the ball support recess 33 of the retainer 32 and also with the front surface of the stage plate 40, while each of the other three balls B can come in rollable contact with the corresponding bottom surface of the ball support recess 34 of the rear yoke 22 and also with the rear surface of the stage plate 40.

Thus, three of the six balls B are in rollable contact with the three ball support recesses 33 of the retainer 32, and the other three of the six balls B are in rollable contact with the three ball support recesses 34 of the rear yoke 40, and at the same time, the six balls B are all in rollable contact with the stage plate 40. Accordingly, the stage plate 40 can linearly move, relative to the front yoke 21 and the rear yoke 22, in the X-direction and the Y-direction from the initial position shown in FIGS. 4 and 5. Furthermore, the stage plate 40 can also rotatably move in a plane parallel to the X-Y axis plane orthogonal to an optical axis OA.

Since two of the five connecting supports 23 projecting rearward from the front yoke 21 extend through the moving range limit holes 41 of the stage plate 40, the slide-movement range of the stage plate 40 is limited by a predetermined range defined by the opening area of each of the moving range limit holes 41 minus the cross-section area of the connecting support 23.

Figure 4:
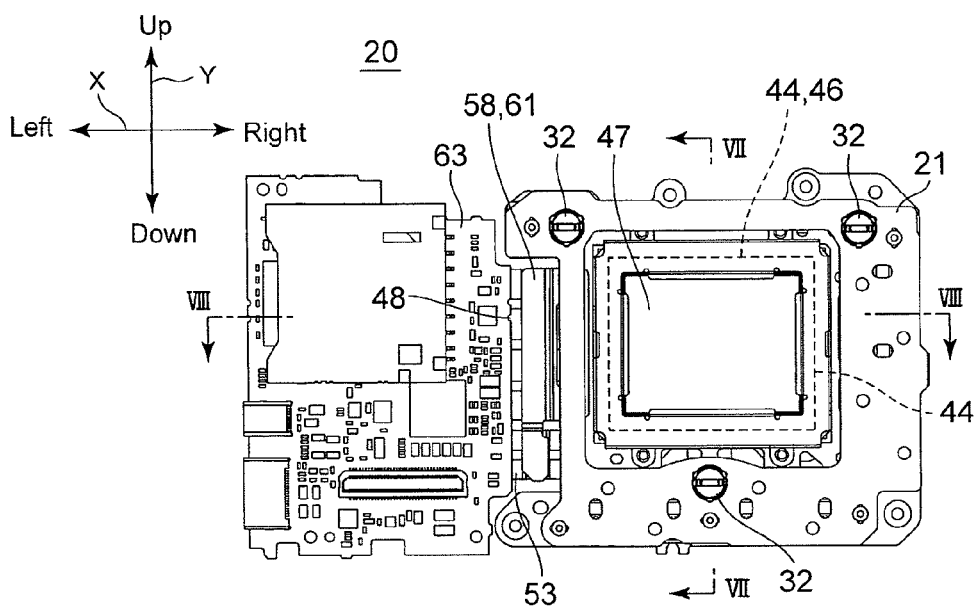
FIG. 4 is a front elevational view of the camera shake correction apparatus.

As shown in FIGS. 3 and 7, a rectangular center hole 43 is formed through the center portion of the stage plate 40. The stage plate 40 is provided with an image sensor (imaging element/image stabilizer/electronic device/electric device) 44 fixed thereto and facing the center hole 43. The image sensor 44 has a substantially rectangular shape as viewed from the front thereof, as shown in FIGS. 4 and 6, and an imaging surface 46 is provided on the front surface thereof. The image sensor 44 is provided with a pair of X-direction edges (upper and lower X-direction edges) 44X which extend parallel to the X-direction, and a pair of Y-direction edges (right and left Y-direction edges) 44Y which extend parallel to the Y-direction, when the stage plate 40 is in the initial position shown in FIGS. 4 and 5. A cover glass 47 is fixed to a portion of the image sensor 44 immediately in front of the imaging surface 46. The imaging surface 46 of the image sensor 44 is an image-forming surface on which object-emanating light, which is passed through the lens groups L1, L2 and L3 and through the cover glass 47, is formed as an object image. When the stage plate 40 is in the initial position (when the stage plate 40 is in the state shown in FIGS. 4 and 5), the center of the imaging surface 46 of the image sensor 44 is positioned on the optical axis OA (photographing optical path) of the lens groups L1, L2 and L3.

An image sensor FPC board (communication circuit board) 48 is provided so that a right half portion thereof extends into a portion immediately behind the stage plate 40 as shown in FIG. 4. A large number of lead wires, which extend rearwardly from the image sensor 44, are electrically connected to the front surface of the right half portion of the image sensor FPC board 48 by soldering. The image sensor FPC board 48 is provided with deformed portions 49, each of which is deformed (bent) in a U-shape as viewed from the top of the camera body 12, in the portion slightly to the left of the image sensor FPC board 48 from the lateral center thereof in the X-axis direction. The left end portion of the image sensor FPC board 48 extends in a leftward direction from rear edges of left sections 49b of the deformed portions 49 and is positioned one step further rearward than the right half portion of the image sensor FPC board 48, that extends toward the right side from the rear edges of right sections 49a of the deformed portions 49. Furthermore, as illustrated in FIG. 8, the right-half portion of the image sensor FPC board 48 from the deformed portions 49 is accommodated in the FPC board escape recess 22a (i.e., in the same plane as that of the rear yoke 22), and when the stage plate 40 is in the initial position, the right sections 49a of the deformed portions 49 are substantially parallel to the left sections 49b thereof.

As shown in FIGS. 2 and 6, the stage plate 40 is provided with a pair of (upper and lower) coil mounting holes 50, having the same (vertically-long rectangular) shape, on the right side of the image sensor 44 and are aligned in a direction parallel to the Y-direction edges 44Y (in the Y-direction in FIGS. 2 and 6). The stage plate 40 is also provided with a pair of (left and right) coil mounting holes 51, having the same (horizontally-long rectangular) shape, on the lower side of the image sensor 44 and are aligned in the a direction parallel to the X-direction edges 44X (in the X-direction in FIGS. 2 and 6).

The upper and lower coil mounting holes 50, aligned in the Y-axis direction of the stage plate 40, fixedly accommodate an X-direction drive coil (first coil/drive member/first drive member/electronic device/electric device) CXA and an X-direction drive coil (second coil/drive member/first drive member/electronic device/electric device) CXB, respectively. The upper and lower X-direction drive coils CXA and CXB have the same specifications (have the same number of coil windings), are parallel to the X-Y axis plane, and have over one hundred coil windings (both in the direction parallel to the stage plate 40 and in the direction of thickness of the stage plate 40). The two X-direction drive coils CXA and CXB are positioned to always correspond to the aforementioned two X-direction magnetic circuits (the magnetic fields), respectively, regardless of the position of the stage plate 40. In other words, the two X-direction drive coils CXA, CXB are positioned to face the upper and lower pairs of X-direction magnets MX, respectively, in the Z-direction. When an electric current in one direction is supplied to both the X-direction drive coils CXA and CXB, each of the X-direction drive coils CXA and CXB produces a linear drive force in a direction FX1 (that is a direction parallel to the X-direction edges 44X), as shown in FIG. 6. When an electric current in the other (opposite) direction is supplied to both the X-direction drive coils CXA and CXB, each of the X-direction drive coils CXA and CXB produces a linear drive force in a direction FX2 (that is also a direction parallel to the X-direction edges 44X), shown in FIG. 6.

The left and right coil mounting holes 51, fixedly accommodate a Y-direction drive coil (first coil/drive member/second drive member/electronic device/electric device) CYA and a Y-direction drive coil (second coil/drive member/second drive member/electronic device/electric device) CYB, respectively. The left and right Y-direction drive coils CYA and CYB have the same specifications (have the same number of coil windings), are parallel to the X-Y axis plane, and have over one hundred coil windings (both in the direction parallel to the stage plate 40 and in the direction of thickness of the stage plate 40). The two Y-direction drive coils CYA and CYB are positioned to always correspond to the aforementioned two Y-direction magnetic circuits (the magnetic fields), respectively, regardless of the position of the stage plate 40. In other words, the two Y-direction drive coils CYA and CYB are positioned to face the left and right Y-direction magnets MYA and MYB, respectively, in the Z-direction. When an electric current in one direction is supplied to both the Y-direction drive coils CYA and CYB, each of the Y-direction drive coils CYA and CYB produces a linear drive force in the direction FY1 (that is a direction parallel to the Y-direction edges 44Y), as shown in FIG. 6. When an electric current in the other (opposite) direction is supplied to both the Y-direction drive coils CYA and CYB, each of the Y-direction drive coils CYA and CYB produces a linear drive force in the direction of FY2 (that is also the direction parallel to the Y-direction edges 44Y), shown in FIG. 6.

A coil energization FPC board (communication circuit board) 53 is provided, in which the right half portion thereof (as viewed from the front of the camera body 12) is fixed to the rear surface of the stage plate 40. The right half portion of the coil energization FPC board 53 is L-shaped as viewed from the front thereof, with which the each terminal of the X-direction drive coils CXA and CXB, and the Y-direction drive coils CYA and CYB, are electrically connected, respectively. The coil energization FPC board 53 is provided with deformed portions 54, each of which is bent in a U-shape as viewed from the top of the camera body 12, in the portion slightly to the left end of the coil energization FPC board 53 from the lateral center thereof in the X-axis direction. The left end portion of the coil energization FPC board 53 extends towards the left side from the rear edge of each of left sections 54b of the deformed portions 54, is positioned at one step further rearward than the right half portion of the coil energization FPC board 53, that extends toward the right side from the rear corner of each of right sections 54a of the deformed portions 54. Furthermore, as illustrated in FIG. 8, when the stage plate 40 is in the initial position, the right sections 54a of the deformed portions 54 are substantially parallel to the left sections 54b thereof.

As shown in FIGS. 2 and 6, the coil energization FPC board 53 is provided with an X-direction Hall element HX and a pair of Y-direction Hall elements HY, respectively fixed by soldering onto the front surface of the coil energization FPC board 53. The X-direction Hall element HX is positioned inside the upper X-direction drive coil CXA. The pair of Y-direction Hall elements HY are positioned inside the left and right of Y-direction drive coils CYA and CYB, respectively.

The coil energization FPC board 53 is also provided with an electric resistor (driving force reducer) 56 which is positioned inside the lower X-direction drive coil CXB and soldered onto the front surface of the coil energization FPC board 53.

As shown in FIGS. 2, 6 and 8, the right end of an FPC board cover member 58, which has a substantially crank-shaped cross sectional view, is fixed to the left edge of the front surface of the stage plate 40. The FPC board cover member 58 has been prepared by bending a thin metal plate (for example copperplate), and includes a fixing portion 59, a front surface protector 61 and a right edge protector 60. The fixing portion 59 is constitutes the right edge of the FPC board cover member 58 and is fixed to the stage plate 40. The front surface protector 61 is positioned immediately in front of the front end parts of the deformed portions 49 in the Z-axis direction, and protects the front end parts of the deformed portions 49. The right edge protector 60 is provided (defined) between the left corner edge of the fixing portion 59 and the right corner edge of the front surface protector 61, and is also positioned on the right side of the right sections 49a of the deformed portions 49 to protect the right sections 49a. A more effective heat radiation and lighter weight structure can be accomplished in the case where the FPC board cover member 58 is made of copper. The deformed portions 49 of the image sensor FPC board 48 and the deformed portions 54 of the coil energization FPC board 53 are both positioned within a clearance between the left edge of the stage plate 40 and the right edge of a control circuit board 63, and the front surface protector 61 is positioned immediately in front of the deformed portions 49 and 54.

As discussed above, the image sensor 44, the image sensor FPC board 48, the coil energization FPC board 53, the electric resistor 56, the FPC board cover member 58, the pair of X-direction drive coils CXA and CXY, the pair of Y-direction drive coils CYA and CYB, the X-direction Hall element HX, and the pair of Y-direction Hall elements HY are all fixed to the stage plate 40. Hence, the stage plate 40, the image sensor 44, the cover glass 47, the image sensor ETC board 48 (excluding the left end portion fixed to the rear surface of the control circuit board 63, of which details will be discussed afterwards), the coil energization FPC board 53 (excluding the left end portion fixed to the rear surface of the control circuit board 63, of which details will also be discussed afterwards), the electric resistor 56, the FPC board cover member 58, the pair of X-direction drive coils CXA and CXY, the pair of Y-direction drive coils CYA and CYB, the X-direction Hall element HX, and the pair of Y-direction Hall elements HY configure an integrated movable body 62, and this integrated movable body 62 is slidably movable relative to the front yoke 21 and the rear yoke 22. The distance in a direction parallel to the Y-direction edges 44Y from a reference straight line SLX, passing through the center of gravity G of the integrated movable body 62 and extending in a direction parallel to the X-direction edges 44X, to the center of driving force of the lower X-direction drive coil CXB (i.e., the center of driving force of the lower X-direction drive coil CXB in the Y-axis direction) is longer than the distance in a direction parallel to the Y-direction edges 44Y from the reference straight line SLX to the center of driving force of the upper X-direction drive coil CXA (i.e., the center of the driving force of the upper X-direction drive coil CXA in the Y-axis direction). On the other hand, the distance in a direction parallel to the X-direction edges 44X from a reference straight line SLY, passing through the center of gravity G of the integrated movable body 62 and extending in a direction parallel to the Y-direction edges 44Y, to the center of driving force of the left Y-direction drive coil CYA, and the distance in the direction parallel to the X-direction edges 44X from the reference straight line SLY to the center of driving force of the right Y-direction drive coil CYB, are the same as each other.

Figure 5:
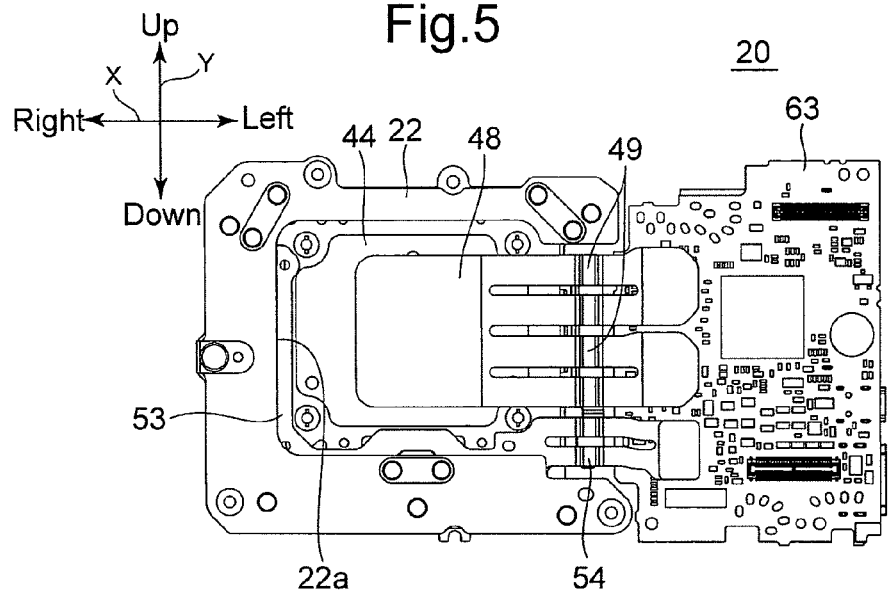
FIG. 5 is a rear elevational view of the camera shake correction apparatus.
Figure 6:
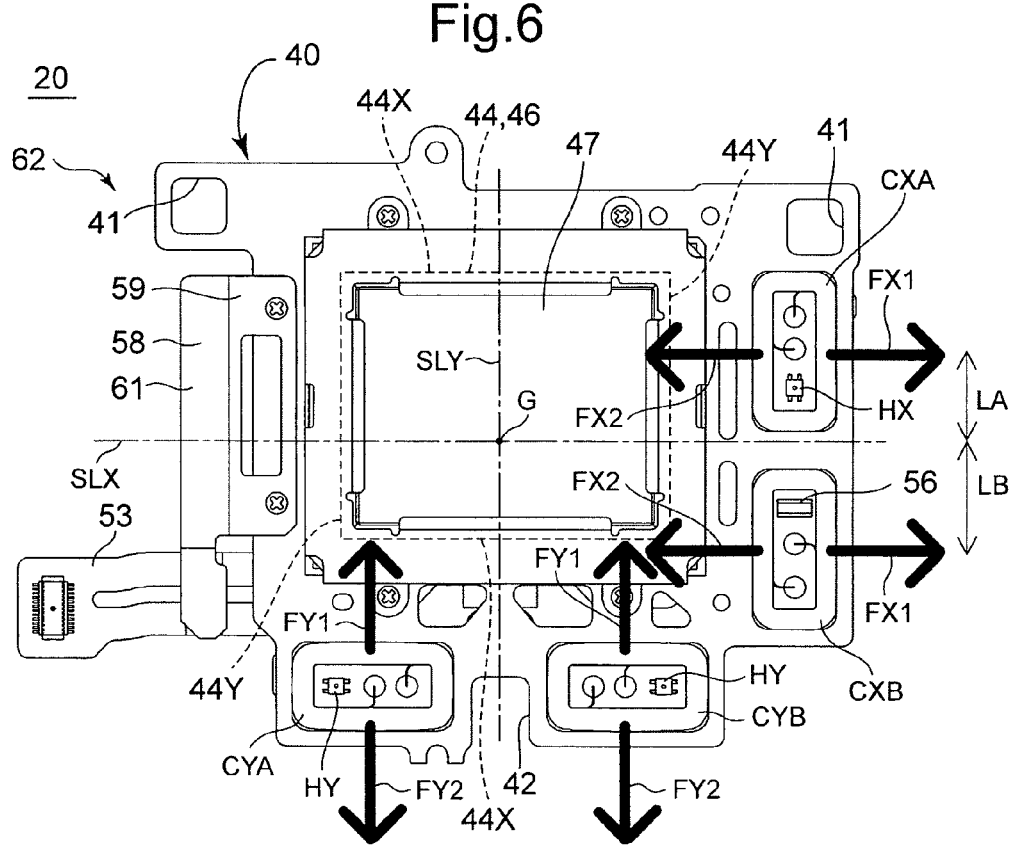
FIG. 6 is a front elevational view of an integrated movable body in which an image sensor FPC board is not shown for the purpose of clarity.

As shown in FIGS. 4 and 5, the control circuit board (electric power supply) 63, which is made of a rigid material, is positioned on the left side of the front yoke 21, the rear yoke 22 and the stage plate 40, and is parallel to the stage plate 40. The control circuit board 63 is positioned substantially in the same plane as those of the rear yoke 22 and the stage plate 40, and is fixed to the inner surface of the camera body 12 by fixing screws (not shown).

Figure 9A:
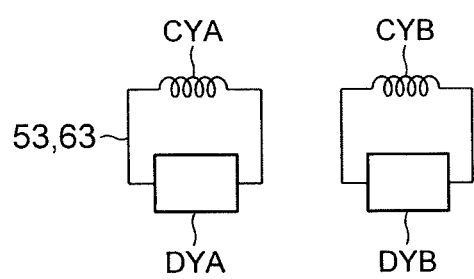
FIG. 9A is an electric circuit diagram showing an arrangement of a pair of Y-direction drivers and a pair of Y-direction drive coils.
Figure 9B:
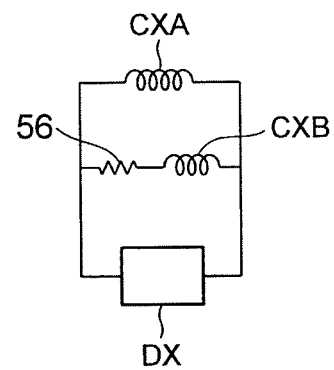
FIG. 9B is an electric circuit diagram showing an arrangement of an X-direction driver and an X-direction drive coil.

The rear surface of the control circuit board 63 is fixedly connected to the left end portions of the image sensor FPC board 48 and the coil energization FPC board 53. As illustrated in FIGS. 9A and 9B, the control circuit board 63 is provided with a Y-direction driver DYA (second driver) for electrically controlling the Y-direction drive coil CYA, another Y-direction driver DYB (second driver) for electrically controlling the Y-direction drive coil CYB, and a single X-direction driver DX (first driver) for simultaneously electrically controlling the pair of X-direction coils CXA and CXB. In FIG. 9A, the Y-direction driver DYA and the Y-direction drive coil CYA are connected in series to an electric circuit formed on the coil energization FPC board 53 and the control circuit board 63, and the other Y-direction driver DYB and the Y-direction drive coil CYB are also connected in series to the same electric circuit. On the other hand, in FIG. 9B, the X-direction drive coil CXB (with the electric resistor 56) and the X-direction drive coil CXA are connected in parallel to the one X-direction driver DX to the above-mentioned electric circuit formed on the coil energization FPC board 53 and the control circuit 63.

Furthermore, a battery (not shown) and a gyro sensor GS (see FIG. 1), which are provided inside the camera body 12, are each connected to the control circuit 63.

The components to which the numerators 20 through 63 have been designated are the components of the camera shake correction apparatus 20.

The camera shake correction apparatus 20 carries out a camera shake correction (image shake compensation) by supplying electric current from the control circuit board 63 to the X-direction drive coils CXA and CXB and the Y-direction drive coils CYA and CYB via the coil energization FPC board 53.

More specifically, if the camera 10 shakes in the X-axis direction while a camera shake correction switch SW (see FIG. 1) provided on the camera body 12 is depressed, the gyro sensor GS incorporated in the camera 10 detects the angular velocity of the camera body 12. Thereupon, based on data on the angular velocity, the X-direction driver DX of the control circuit board 63 calculates the moving distance (amount of camera shake) in the X-axis direction, and passes the same value of electric current through the X-direction drive coil CXA and the electric resistor 56. Since electric current passing through the electric resistor 56 is passed through the X-direction drive coil CXB after the electric current thereof is reduced by the electric resistor 56, the electric current that passes through the X-direction drive coil CXB becomes a smaller amount that of the electric current that passes through the X-direction drive coil CXA, and accordingly, the driving force produced by the X-direction drive coil CXB in the direction of arrow FX1 (or arrow FX2) is smaller than the driving force produced by the X-direction drive coil CXA in the direction of arrow FX1 (or arrow FX2). The resistance of the electric resistor 56 has been set to an optimum value in which the difference between the distance in the direction parallel to the Y-direction edges 44Y from the reference straight line SLX to the center of driving force of the X-direction drive coil CXA (double-arrow line LA of FIG. 6) and the distance in the direction parallel to the Y-direction edges 44Y from the reference straight line SLX to the center of driving force of the X-direction drive coil CXB (double-arrow line LB of FIG. 6) is cancelled out by the difference between the value of electric current passing through the X-direction drive coil CXA (IA) and the value of electric current passing through the other X-direction drive coil CXB (IB). In other words, the resistance value of the electric resistor 56 has been set in which the following relationship is established:

$LA:LB=IB:IA.$

Accordingly, although the distance in the direction parallel to the Y-direction edges 44Y from the reference straight line SLX, which is parallel to the X-direction edges 44X and passes through the center of gravity G of the integrated movable body 62, to the lower X-direction drive coil CXB (double-arrow line LB in FIG. 6) is longer than the distance in the direction parallel to the Y-direction edges 44Y from the reference straight line SLX to the upper X-direction drive coil CXA (double-arrow line LA in FIG. 6), in other words, although the upper X-direction drive coil CXA and the lower X-direction drive coil CXB are not symmetrical with respect to the reference straight line SLX, the integrated movable body 62 (the stage plate 40) can be linearly moved in the directions of the arrows FX1 and FX2. Thus, upon camera shake occurring, since the image sensor 44 (i.e., the integrated movable body 62) linearly moves relative to the camera body 12 in the direction of arrow FX1 or arrow FX2 that is opposite to the image shake direction by the same amount as that of the camera shake, the image shake of the image sensor 44 is compensated. The amount of sliding movement of the integrated movable body 62 in the X-axis direction is detected by the X-direction Hall element HX.

Whereas, if the camera 10 shakes in the Y-axis direction while the camera shake correction switch SW is depressed, the gyro sensor GS detects the angular velocity of the camera body 12. Thereupon, based on data on the angular velocity, the pair of Y-direction drivers DYA and DYB of the control circuit board 63 calculates the moving distance (amount of camera shake) in the Y-axis direction, and passes the same value of electric current through the pair of Y-direction drive coils CYA and CYB. Accordingly, the Y-direction drive coils CYA and CYB produce the same value of driving force in the direction of arrow FY1 (or arrow FY2). As discussed above, since the distance in the direction parallel to the X-direction edges 44X from the reference straight line SLY, which is parallel to the Y-direction edges 44Y and passes through the center of gravity G of the integrated movable body 62, to the left Y-direction drive coil CYA, and the distance in the direction parallel to the X-direction edges 44X from the reference straight line SLY to the right Y-direction drive coil CYB are the same, when the electric current of the same value is supplied to the both right Y-direction drive coil CYA and the left Y-direction drive coil CYB, the integrated movable body 62 (i.e., the stage plate 40) moves linearly parallel to the direction arrow FY1 or arrow FY2 (in a direction parallel to the Y-direction edges 44Y). Upon camera shake occurring, since the image sensor 44 (i.e., the integrated movable body 62) linearly moves relative to the camera body 12 in the direction of arrow FY1 or arrow FY2 that is opposite to the image shake direction by the same amount of that of the camera shake, the image shake of the image sensor 44 is compensated. The amount of slide movement of the integrated movable body 62 in the Y-axis direction is detected by the Y-direction Hall element HY.

If shake of the camera 10 in the rotational direction occurs while the camera shake correction switch SW is depressed, the gyro sensor GS detects the angular velocities of the camera body 12. Thereupon, based on data on the angular velocities, the X-direction driver DX and the pair of Y-direction drivers DYA and DYB of the control circuit board 63 calculate the moving distance (amount of camera shake) in the X-axis and Y-axis directions, and passes electric current through the upper X-direction drive coil CXA, the electric resistor 56 connected to the lower X-direction drive coil CXB, and the pair of Y-direction drive coils CYA and CYB. The value of electric current passing through the upper X-direction CXA and the electric resistor 56 is the same. However, the value of electric current passing through the left Y-direction drive coil CYA is different from the value of electric current passing through the right Y-direction drive coil CYB. Accordingly, the left Y-direction drive coil CYA produces a driving force that is different from the driving force of the right Y-direction drive coil CYB. Upon camera shake occurring, due to the resultant force produced by the X-direction drive coils CXA and CXB in the direction of arrow FX1 or arrow FX2 and also the force produced by the Y-direction drive coils CYA and CYB in the direction of arrow FY1 or arrow FY2, the image sensor 44 (i.e., the integrated movable body 62) rotatably moves in the direction opposite to the rotational image shake direction by the same amount of that of the camera shake, whereby the image shake of the image sensor 44 is compensated.

Upon compensation of image shake, when a shutter release button (not shown) of the camera body 12 is depressed, the control circuit board 63 transmits a imaging signal (electric signal) to the image sensor 44 via the image sensor FPC board 48, whereby the image sensor 44 carries out an imaging operation. The image sensor 44 transmits imaging data (electric signal) to the control circuit board 63 via the image sensor FPC board 48, and the corresponding object image appears on a display (not shown), which is provided on the rear surface of the camera body 12.

In the illustrated embodiment of the present invention, the control circuit board 63 is not positioned immediately behind the rear yoke 22, but is positioned on the left side of the front yoke 21 and the rear yoke 22. Therefore, since the thickness of the camera shake correction apparatus 20 can be minimized (slimmed down) in the Z-axis direction, it is possible to slim down the thickness of the camera body 12 in the Z-axis direction.

When the stage plate 40 (i.e., the integrated movable body 62) slidably moves in the X-axis direction relative to the front yoke 21 and the rear yoke 22, both the deformed portions 49 of the image sensor FPC board 48 and the deformed portions 54 of the coil energization FPC board 53 expand or shrink (i.e., flex/deform) in the X-axis direction. Therefore, the image sensor FPC board 48 or the coil energization FPC board 53 does not prevent the sliding movement of the stage plate 40 (the integrated movable body 62), and the stage plate 40 (the integrated movable body 62) can slidably move in a smooth manner in the X-axis direction. When the stage plate 40 (the integrated movable body 62) slidably moves in the Y-axis direction or rotates relative to the front yoke 21 and the rear yoke 22, both the deformed portions 49 and the deformed portions 54 flexibly move so that the right sections 49a and 54a and the left sections 49b and 54b move in a non-parallel manner, relative to each other. Accordingly, the stage plate 40 (the integrated movable body 62) can slidably move in a smooth manner both in the Y-axis direction and in the rotational direction.

The front surface protector 61 of the FPC board cover member 58 is positioned immediately in front of the deformed portions 49 and the deformed portions 54, and the right edge protector 60 of the FPC board cover member 58 is positioned on the right side of the right sections 49a and 54a. Accordingly, when the thickness of the camera body 12 in the Z-axis direction is minimized, even in the case where camera parts other than the camera shake correction apparatus 20 inside the camera body 12 (for example, a shutter) need to be positioned in front of the FPC board cover member 58, the deformed portions 49 (the image sensor FPC board 48) and/or the deformed portions 54 (the coil energization FPC board 53) do not come in contact with such camera parts. Furthermore, the right sections 49a of the deformed portions 49 and the right sections 54a of the deformed portions 54 do not come in contact with the left end portions of the front yoke 21 or the rear yoke 22. Accordingly, even when the thickness of the camera body 12 is minimized in the Z-axis direction, the image sensor FPC board 48 and the coil energization ETC board 53 are protected from abrasion and damage.

The right-side portion of the image sensor FPC board 48 with respect to the deformed portions 49, as viewed from the front thereof, is positioned inside the FPC board escape recess 22a. Accordingly, when the distance between the front yoke 21 and the rear yoke 22 in the Z-axis direction is shortened for the purpose of slimming down (miniaturizing) the camera body 12 in the Z-axis direction, the right-side portion of the image sensor FPC board 48 (the portion on the right side of the deformed portions 49) does not come in contact with the rear yoke 22. Thus the image sensor FPC board 48 is protected from abrasion and damage.

Although the present invention has been applied to the above-described embodiment of the camera shake correction apparatus, the present invention is not limited to the above embodiment; various modifications can be made.

Figure 10:
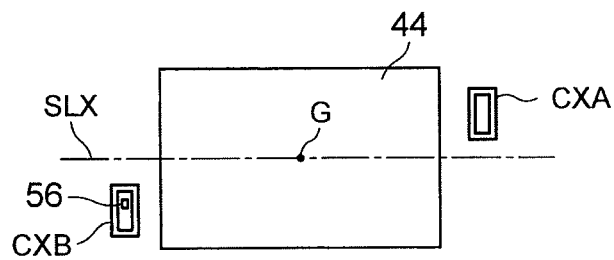
FIG. 10 is a schematic diagram of a first modified embodiment showing an arrangement of the image sensor and a pair of X-direction drive coils, viewed from the front thereof.

FIG. 10 shows a first modified embodiment of the present invention, in which the distance in a direction parallel to the Y-direction edges 44Y from the reference straight line SLX to the center of driving force of the lower X-direction drive coil CXB is longer than the distance in the direction parallel to the Y-direction edges 44Y from the reference straight line SLX to the upper X-direction drive coil CXA. Furthermore, according to the first modified embodiment, the lower X-direction drive coil CXB is positioned on the left side of the image sensor 44 and fixed to the stage plate 40, and as in the embodiment shown in FIG. 9B, the electric resistor 56 is provided in the electric circuit formed on the coil energization FPC board 53 and the control circuit board 63. The first modified embodiment of the present invention can also exhibit the same function and effect as those of the above illustrated embodiment.

Figure 11:
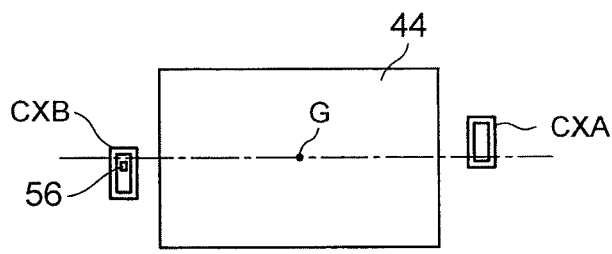
FIG. 11 is a schematic diagram of a second modified embodiment showing an arrangement of the image sensor and a pair of X-direction drive coils, viewed from the front thereof.

FIG. 11 shows a second modified embodiment of the present invention, in which the lower X-direction drive coil CXB is positioned on the left side of the image sensor 44, while the upper X-direction drive coil CXA is positioned on the right side of the image sensor 44. In addition, the upper portion of the lower (left-side) X-direction drive coil CXB and the lower portion of the upper (right-side) X-direction drive coils CXA partially coincide with each other in the direction parallel to the Y-direction edges 44Y, relative to the reference straight line SLX. The distance in a direction parallel to the Y-direction edges 44Y from the reference straight line SLX to the center of driving force of the lower (right-side) X-direction drive coil CXB is longer than the distance in the direction parallel to the Y-direction edges 44Y from the reference straight line SLX to the upper (left-side) X-direction drive coil CXA, and as in the embodiment shown in FIG. 9B, the electric resistor 56 is provided in the electric circuit formed on the coil energization FPC board 53 and the control circuit board 63. The second modified embodiment of the present invention can also exhibit the same function and effect as those of the above first-mentioned embodiment.

Furthermore, the pairs of X-direction magnets MX and the pairs of Y-direction magnets MY can be fixed to the rear yoke 22, instead of fixing to the front yoke 21.

The electric resistor 56 may be excluded, and instead a magnetic flux reducer can be provided on the front yoke 21 or the stage plate 40. The magnetic flux reducer serves for reducing the force of magnetic field (the magnetic flux density) produced by the pair of X-direction magnets MX facing the lower X-direction drive coil CXB compared with that produced by the pair of X-direction magnets MX facing the upper X-direction drive coil CXA. For example, the magnetic flux reducer can include a covering material that partially covers each of the pair of X-direction magnets MX facing the X-direction drive coil CXB, or a permanent magnet that reduces the magnetic flux density in the magnetic field of the pair of X-direction magnets MX facing the X-direction drive coil CXB by applying magnetic force thereto. Although the same amount of electric current is supplied to the X-direction drive coils CXA and CXB, since the magnetic field around the lower X-direction drive coil CXB has a smaller magnetic flux density than that of the upper X-direction drive coil CXA, the driving force produced by the X-direction drive coil CXB is smaller than the driving force produced by the X-direction drive coil CXA. Thus the same function and effect as those of the illustrated embodiment can be accomplished.

The distance in a direction parallel to the Y-direction edges 44Y from the reference straight line SLX to the center of driving force of the lower X-direction drive coil CXB can be set shorter than the distance in the direction parallel to the Y-direction edges 44Y from the reference straight line SLX to the center of driving force of the upper X-direction drive coil CXA. In this modified embodiment, the amount of electric current passing through the upper X-direction drive coil CXA is set smaller than that passing through the lower X-direction drive coil CXB by utilizing the electric resistor 56, or alternatively, the magnetic flux reducer can also be utilized for reducing the magnetic flux density in the magnetic field, produced by the pair of X-direction magnets MX facing the upper X-direction drive coil MXA, to be smaller than that produced by the pair of X-direction magnets MX facing the lower X-direction drive coil MXB.

Furthermore, in the case where the distance in a direction parallel to the X-direction edges 44X from the reference straight line SLY to the left Y-direction drive coil CYA and the distance in a direction parallel to the X-direction edges 44X from the reference straight line SLY to the right Y-direction drive coil CYB are different from each other, the image shake in the Y-axis direction is compensated by supplying different amounts of electric current between the electric current from the Y-direction driver DYA to the Y-direction drive coil CYA and the electric current from the Y-direction driver DYB to the Y-direction drive coil CYB. For example, if the distance from the reference straight line SLY to the left Y-direction drive coil CYA is longer than the distance from the reference straight line SLY to the right Y-direction drive coil CYB, the amount of electric current passing through the right Y-direction drive coil CYB is set smaller than that passing through the left Y-direction drive coil CYA. Accordingly, the image shake in the Y-axis direction is compensated by linear movement of the integrated movable body 62 in the direction of arrow FY1 or arrow FY2.

Furthermore, the function of the pair of X-direction drive coils CXA and CXB and the function of the pair of Y-direction drive coils CYA and CYB can be exchanged (switched) with each other. In this modified embodiment, the pair of X-direction drive coils CXA and CXB can produce different amounts of driving force from each other. One of the pair of Y-direction drive coils CYA and CYB is provided with a driving force reducer, so that the pair of Y-direction drive coils CYA and CYB can constantly produce the same amount of driving force. For example, the driving force reducer can include the electric resistor 56 electrically connected to one of the pair of Y-direction drive coils CYA and CYB, or the magnetic flux reducer that renders different magnetic flux densities in the magnetic fields between the pair of magnets MYA and MYB, respectively facing the pair of Y-direction drive coils CYA and CYB, so that one of the magnetic flux densities has a smaller value than the other.

Note that out of the X-direction drive coils and the Y-direction drive coils, the drive coils that carry out the rotation control of the integrated movable body 62 can include three coils.

Figure 12:
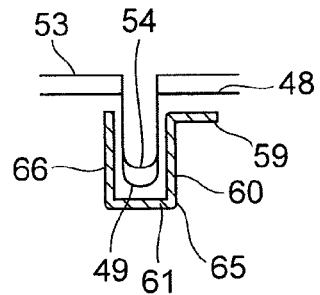
FIG. 12 is an enlarged cross sectional view of a third modified embodiment showing an FPC board cover member, an image sensor FPC board and a coil energization FPC board.

FIG. 12 shows a third modified embodiment of the present invention in which, instead of the FPC board cover member 58 as discussed above, a FPC board cover member 65 having an alternative shape is fixed to the stage plate 40 via the fixing portion 59. The FPC board cover member 65 is provided with the fixing portion 59, the right edge protector 60, the front surface protector 61, and also a left edge protector 66 that projects rearward from the left edge of the front surface protector 61. According to the third modified embodiment of the present invention, in addition to the protection of the front surface and the right side of the deformed portions 49 of the image sensor FPC board 48 and the deformed portions 54 of the coil energization FPC board 53, the left side of the deformed portions 49 can 54 can also be protected by the left edge protector 66.

Figure 13:
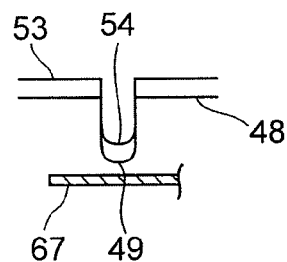
FIG. 13 is an enlarged cross sectional view of a fourth modified embodiment showing an FPC board cover member, an image sensor FPC board and a coil energization FPC board.

FIG. 13 shows a fourth modified embodiment of the present invention. A FPC board cover member 67, which only is provided with an element corresponding to the front surface protector 61, is provided for covering the front surface of the deformed portions 49 and 54. The right edge of the FPC board cover member is fixed to the stage plate 40 (not shown).

Figure 14:
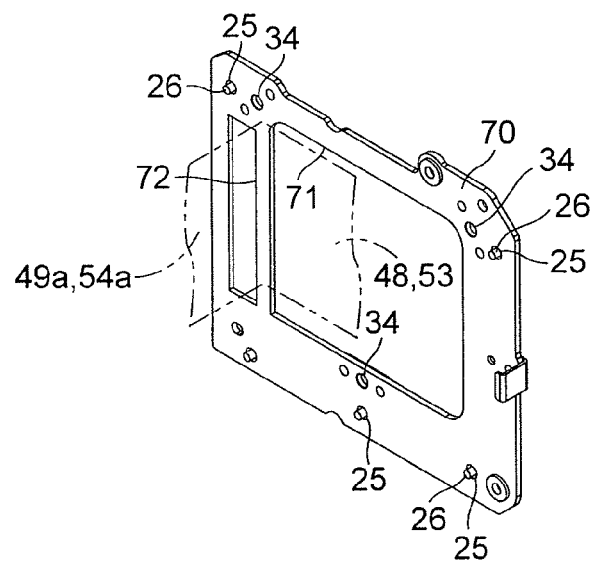
FIG. 14 is a perspective view of a fifth modified embodiment showing a rear yoke, an image sensor FPC board and a coil energization FPC board.

FIG. 14 shows a fifth modified embodiment of the present invention.

A rear yoke 70 is provided, having a rectangular frame shape, two X-direction sides and two Y-direction sides, and a center through-hole 71 formed at the center thereof. A lateral-side through-hole 72 is also formed in the left side portion of the rear yoke 70. The lateral-side through-hole 72 is elongated in the vertical direction of the camera body 12 and formed separately from the center through-hole 71.

As illustrated in FIG. 14, the right sections 49a of the image sensor FPC board 48 and the right sections 54a of the coil energization FPC board 53 are inserted in the lateral-side through-hole 72 from the rear of the rear yoke 70. The fixing portion 59 (not shown in FIG. 14) of the FPC board cover member 58 (or 65, 67) is fixed to the left side portion of the rear yoke 70.

According to the fifth modified embodiment of the present invention, the upper and lower left end portions of the rear yoke 70 extending in the X-axis direction are connected to each other by the Y-axis frame that is provided at the left side portion of the rear yoke 70. Therefore, the mechanical strength of the rear yoke 70 is greater than that of the rear yoke 22.

When the stage apparatus according to the present invention is accommodated inside the lens barrel 11, instead of the image sensor 44, a correction lens group (image stabilizer) can be fixed to the stage plate 40 at the same position as that of the image sensor 44.

The correction lens group is positioned in the photographing optical path and constitutes part of the imaging optical system together with the lens groups L1 through L3. When the stage plate 40 slidably moves, the correction lens group moves along the surface orthogonal to the optical axis CA, whereby the image shake is compensated.

Furthermore, a rigid circuit board can be provided immediately behind the stage plate 40 and parallel to the stage plate 40, and the lead wires of the image sensor 44 can be connected to terminals of the rigid circuit board by soldering. In this case, the right-end portion of the image sensor 48 is electrically connected to the rigid circuit board.

The stage plate 40 can be provided with two pairs of X-direction magnets MX (drive member/first drive member) aligned in a direction parallel to the Y-direction edges 44Y, and also with two pairs of Y-direction magnets MYA and MYB (drive member/second drive member) aligned in a direction parallel to the X-direction edges 44X, respectively fixed to the stage plate 40. The front yoke 21 (or the rear yoke 22) is provided with the pair of X-direction drive coils CXA and CXB arranged in a direction parallel to the Y-direction edges 44Y, and also with the pair of Y-direction drive coils CYA and CYB arranged in a direction parallel to the X-direction edges 44X. In this modified embodiment, a driving force reducer for reducing the magnetic flux density in the magnetic field is provided at one of the two pairs of the X-direction magnets MX that is positioned at a longer distance in a direction parallel to the Y-direction edges 44Y from the reference straight line SLX than the other of the two pairs of the X-direction magnets MX.

The above embodiments of the present invention are applied to the camera shake correction apparatus 20 in which the stage plate 40 can rotate in the X-Y plane. However, the present invention can also applied to a known image shake correction apparatus in which the stage plate 40 linearly moves only in the X-axis direction and the Y-axis direction, or to any stage apparatus having different usage or purpose from that of the image shake correction apparatus, as long as a member of the stage apparatus can linearly move in the X-axis and Y-axis directions or rotationally move.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A stage apparatus comprising:
   a stationary support plate;
   a magnetic force generator which is immovable relative to said stationary support plate; a stage member that is superimposed on said stationary support plate in a thickness direction of said stationary support plate, wherein said stage member is slidably movable relative to said stationary support plate in a plane;
   an image sensor fixed to said stage member;
   a control circuit board which is immovably provided at a lateral side of said stage member; and
   a coil, which produces a driving force upon a supply of electric current thereto, positioned within a magnetic field produced by said magnetic force generator, said coil being fixed to said stage member at a position on an opposite side of the center of said stage member with respect to said control circuit board; and
   at least one FPC board provided between said stationary support plate and said stage member, said FPC board electrically connecting said image sensor and said control circuit board, and transmitting an electric signal between said image sensor and said control circuit board,
   wherein said stationary support plate includes an aperture and an FPC board escape recess that opens, from a minor side of said stationary support plate at which said control circuit board is provided, in a direction toward said coil, said FPC board escape recess extending from said aperture to an exterior of said stationary support plate, said FPC board escape recess being configured to receive therein at least a part of said FPC board.

2. A camera shake correction apparatus provided in a camera, said camera shake correction apparatus using the stage apparatus according to claim 1, wherein said stage apparatus is incorporated in said camera,
   wherein said camera shake correction apparatus is further provided with a gyro sensor for detecting image shake of said camera, and
   wherein said control circuit board passes electric current through said coils based on angular velocity information detected by said gyro sensor to compensate image shake of an object image captured by said image sensor.

3. The stage apparatus according to claim 1, wherein the FPC board escape recess extends through a body of the stationary support plate.

4. A stage apparatus comprising:
   a stationary support plate;
   a magnetic force generator which is immovable relative to said stationary support plate;
   a stage member that is superimposed on said stationary support plate in a thickness direction of said stationary support plate, wherein said stage member is slidably movable relative to said stationary support plate in a plane;
   a control circuit board which is immovably provided at a lateral side of said stage member;
   an image sensor fixed to said stage member; and
   a first FPC board provided between said stationary support plate and said stage member, said first FPC board electrically connecting said image sensor and said control circuit board,
   wherein said stage member is provided with a cover member fixed thereto, for protecting at least a part of said first FPC board, the cover member including a first cover portion fixed to the stage member and extending in a plane of the stage member, a second cover portion comprising a front surface protective portion that extends in a plane transverse to the first cover portion and a third cover portion comprising an edge protective portion that extends in a plane transverse to the plane of the second cover portion.

5. The stage apparatus according to claim 4, further comprising:
   a coil, which produces a driving force upon a supply of electric current thereto, positioned within a magnetic field produced by said magnetic force generator, said coil being fixed to said stage member at a position on an opposite side of the center of said stage member with respect to said control circuit board; and
   a second FPC board provided between said stationary support plate and said stage member, said second FPC board electrically connecting said coil and said control circuit board, and supplying electric current from said control circuit board to said coil.

6. The stage apparatus according to claim 5, wherein at least one of said first FPC board and said second FPC board comprises at least one deformed portion having a flexibly changeable shape, provided in a part facing, in said thickness direction, a clearance between said stage member and said control circuit board, and projects in a direction opposite to said stationary support plate,
   wherein said cover member faces said deformed portion from a side opposite to said stationary support plate.

7. The stage apparatus according to claim 2, the third cover portion being positioned to cover at least a part of the first FPC board.

8. The stage apparatus according to claim 2, the stationary support plate and the stage member being received within a housing.

9. A stage apparatus configured to be included in a camera having an image sensor, the stage apparatus comprising:
   an integrated movable body which is slidably movable;
   a pair of coils, both of which apply a linear driving force in one driving direction to said integrated movable body upon an electric current being passed through said pair of coils, said pair of coils being positioned in a magnetic field; and
   a single driver for carrying out an electric current control on said pair of coils, wherein a distance, in a direction orthogonal to said one driving direction, from a center of gravity of an said integrated movable body to the center of driving force of one of said pair of coils is longer than a distance, in the direction orthogonal to said one driving direction, from the center of gravity to the center of driving force of the other of said pair of coils, and wherein said stage apparatus is further provided with a driving force reducer comprising an electric resistor for reducing said driving force in an electric circuit electrically connected to said one of said pair of coils that is located at a longer distance, in the direction orthogonal to said one driving direction from the center of gravity to the center of driving force of said one of said pair of coils.

10. A camera shake correction apparatus, comprising said stage apparatus according to claim 9, wherein said stage apparatus is further provided with one of an image shake correction lens and an image sensor fixed thereto, wherein said camera shake correction apparatus is further provided with a gyro sensor for detecting image shake of said camera, and wherein said electric power supply passes electric current through said pair of coils based on angular velocity information detected by said gyro sensor to compensate image shake of an object image formed through said image shake correction lens or formed on said image sensor.

11. The camera shake correction apparatus according to claim 10, further comprising:

at least one FPC board, wherein one end of said at least one FPC board is electrically connected to said pair of coils, and/or said image sensor, for supplying electric current to said coils, and wherein a control circuit board serving as said electric power supply is provided at a lateral side of said stationary support plate and at an opposite side of said image shake correction lens or image sensor with respect to said pair of coils, and wherein the other end of said FPC board is electrically connected to said control circuit board.

12. The stage apparatus according to claim 9, said pair of coils being provided to apply a linear driving force in said one driving direction and a further pair of coils being provided to apply a linear driving force in a direction orthogonal to said one driving direction.

* * * * *